United States Patent

[11] 3,601,016

| [72] | Inventors | Jacobus Pieter van der Ploeg<br>Velp;<br>Antoni Reinirus Harmsen, Rheden, both of,<br>Nordic Patents |
|---|---|---|
| [21] | Appl. No. | 822,688 |
| [22] | Filed | May 7, 1969 |
| [45] | Patented | Aug. 24, 1971 |
| [73] | Assignee | Algemene Kustzijde Unie, N.V.<br>Arnhem, Netherlands |
| [32] | Priority | May 16, 1968 |
| [33] | | Netherlands |
| [31] | | G806900 |

[54] IMPROVED PROCESS FOR LAYING DOWN AS ASPHALT LAYER ONTO PAVEMENT
1 Claim, No Drawings

[52] U.S. Cl............................................. 94/23,
94/9
[51] Int. Cl. ............................................ E01c 21/00
[50] Field of Search............................................ 156/306;
94/3, 9, 23

[56] References Cited
UNITED STATES PATENTS

| 1,918,155 | 7/1933 | Wallace.......................... | 94/23 |
| 2,653,432 | 9/1953 | Wright .......................... | 156/306 X |
| 3,168,019 | 2/1965 | Lynn............................ | 94/23 X |
| 3,038,393 | 6/1962 | Nagin........................... | 94/23 X |
| 3,332,831 | 7/1967 | Stoller.......................... | 156/306 X |
| 3,334,555 | 8/1967 | Nagin........................... | 94/3 |

*Primary Examiner*—Jacob L. Nackenoff
*Attorney*—Stevens, Davis, Miller & Mosher

ABSTRACT: An improved process is provided for laying down an asphalt layer onto a cool asphalt pavement layer which comprises placing a preformed solid film on said cool asphalt pavement layer to placing hot asphalt on said cool pavement layer, said preformed solid film becoming adhesive when treated with said hot asphalt to bind said hot asphalt to said cool asphalt pavement layer wherein said film comprises a member selected from the group consisting of montan resin, tall oil resin, rosin, a synthetic polymer having a softening point above 50° C., and bitumen having a softening point above 50° C.

IMPROVED PROCESS FOR LAYING DOWN AS ASPHALT LAYER ONTO PAVEMENT

This invention relates to a process for the manufacture of bituminous covering layers, and more particularly asphalt roads, in which the covering layer or road is manufactured in one or more layers and in which under one or each layer an adhesive is applied.

A process of the type is broadly known. If in the known process a second asphalt layer is to be applied to the first asphalt layer after the lapse of some time, it is necessary that for the purpose of obtaining a satisfactory adhesion between the two layers an adhesive should be applied to the first layer. Also in cases where a first asphalt layer is to be applied to, for instance, a worn concrete road, it is necessary that an adhesive should be applied to the road. The adhesive consists of bitumen emulsion which is applied by hand spraying. However, depending on the weather conditions, more particularly frost, rain and extremes of temperature, the spraying of the bitumen emulsion becomes a more or less difficult operation. Moreover, the uniform and proper application of the emulsion requires skilled workers and is rather time consuming.

The present invention has for its object of provide a process of the above-described type which does not show the aforementioned disadvantages. The process according to this invention is characterized in that the adhesive is applied in the form of a film. Such a film may be laid in a simple manner in pieces or it can be unrolled onto the layer which is to be coated with adhesive. Depositing the film in this manner may be done more or less independently of weather conditions and takes only a relatively short time.

According to the present invention, it is preferred that use should be made of a film which besides the adhesive contains from 5 to 20 percent of a softening agent. Favorable results are obtained if according to this invention the softening agent comprises or consists substantially of a copolymer of vinyl acetate and ethylene.

In preferred embodiments of the process according to the present invention, use may be made of a film of which the adhesive comprises or consists substantially of montan resin, or tall resin, or rosin, or a synthetic polymer or bitumen having a softening point higher than 50° C., or mixtures thereof.

This invention also includes the bituminous covering layers, and more particularly asphalt roads, when manufactured by the above-described process.

What I claim is:

1. In the process of laying down an asphalt layer onto a cool asphalt pavement layer, the improvement which comprises placing a preformed solid film on said cool asphalt pavement layer prior to placing hot asphalt on said cool pavement layer, said preformed solid film becoming adhesive when treated with said hot asphalt to bind said hot asphalt to said cool asphalt pavement layer wherein said film comprises a member selected from the group consisting of montan resin, tall oil resin, rosin, a synthetic polymer having a softening point above 50° C., and bitumen having a softening point above 50° C.

UNITED STATES PATENT OFFICE
CERTIFICATE OF CORRECTION

Patent No. 3,601,016　　　　　　　　　Dated August 24, 1971

Inventor(s) Jacobus Pieter van der Ploeg et al

It is certified that error appears in the above-identified patent and that said Letters Patent are hereby corrected as shown below:

Column 1, line 4, change "Nordic Patents" to -- The Netherlands --.

Signed and sealed this 22nd day of February 1972.

(SEAL)
Attest:

EDWARD M. FLETCHER, JR.　　　　　　ROBERT GOTTSCHALK
Attesting Officer　　　　　　　　　　Commissioner of Patents